Patented Oct. 13, 1931

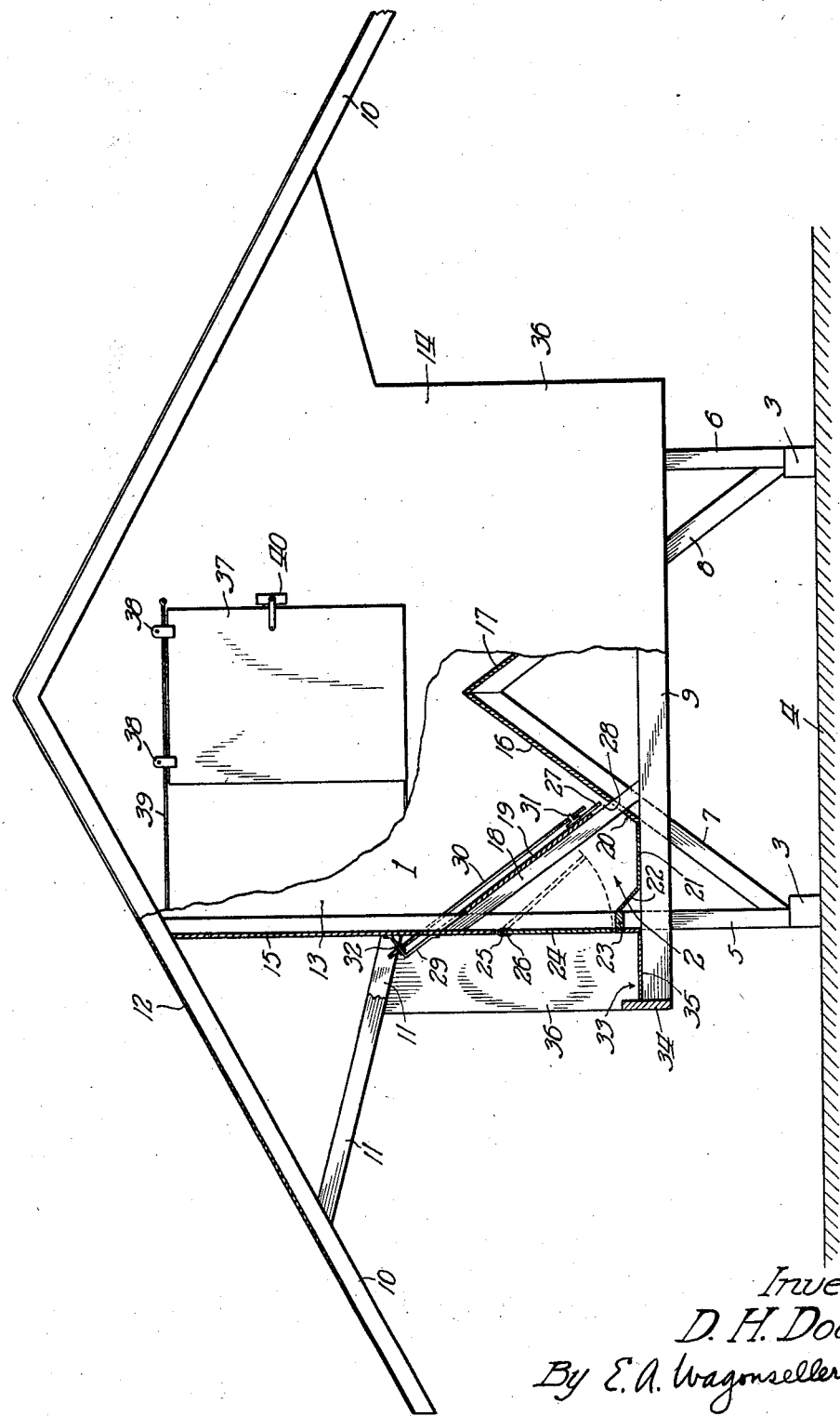

1,827,075

UNITED STATES PATENT OFFICE

DUANE HOWARD DOANE, OF ST. LOUIS, MISSOURI, ASSIGNOR TO WALTER P. PAEPCKE, OF CHICAGO, ILLINOIS

ANIMAL FEEDER

Application filed November 23, 1929. Serial No. 409,226.

The present invention relates to animal feeders and more particularly to that type of animal feeders in which the grain is automatically replenished as it is removed by the animals from the feed receptacle. One object of the invention is to provide an animal feeder of a strong and sturdy character which is easy to build and composed of relatively simple parts not likely to get out of order and requiring a minimum amount of attention. Another object of the invention is to provide an animal feeder in which the feed containing compartment is normally closed but which can be readily opened by the animal desiring to feed therefrom. A further object of the invention is to provide a simple and effective means for adjusting the amount of feed which will flow into the feed receptacle. A still further object of the invention is to provide a particularly efficient construction of feeder in which the members forming the substructure of the feeder cooperate effectively both as means for supporting the feeder in an elevated position and for forming the framework of the interior of the feeder.

To these and other ends the invention resides in certain improvements and combinations of parts, all as will be hereinafter more fully described, the novel features being pointed out in the claims at the end of the specification.

The drawing illustrates an end view, partly in section, of an animal feeder made in accordance with the present invention.

The present embodiment of the invention, as disclosed, provides a feeding device of the class described of a simple, but highly efficient form, capable of being constructed at comparatively low cost, for the most part from standardized materials and being particularly advantageous for feeding the larger domestic animals such as mules and horses.

Referring more particularly to the drawing, there is indicated at 1 a primary storage receptacle for grain or other material to be used for feed. The primary storage receptacle is arranged to deliver grain to a feeding receptacle 2 arranged therebeneath.

While the animal feeder of the present invention may be made in various forms, it is preferably in the form of a shed supported upon frame members out of contact with the ground. Suitable foundation members 3 of stone or cement are laid upon or embedded in the ground, indicated at 4.

Suitable upright frame members, 5 and 6, form the main support for the feeder and have their lower ends resting upon and suitably secured to the foundation members 3, 3. While only a single pair of frame members 5 and 6 have been shown, it will be obvious that any number of uprights may be employed so as to give the desired length of construction. For each frame member 5 and 6 there is provided respectively an inclined frame member 7 and 8. These inclined frame members have their lower ends secured to the respective lower ends of the upright frame members 5 and 6 and have their upper ends secured together and extending well up into the feeder construction for a purpose which will be presently brought out.

A horizontal frame member 9 respectively connects the individual units of frame members 5, 6, 7 and 8 so that there is provided a very strong and rigid construction for the frame and substructure of the feeder.

The roof structure of the feeder preferably comprises a plurality of rafters 10, 10 secured in any desirable manner to the upper ends of the individual units of the frame members 5 and 6. Braces, such as indicated at 11, may be employed to support the wide, overhanging eaves. 12 indicates any suitable roof covering. End walls 13 and 14, of any suitable material, are provided for enclosing the ends of the feeder. Side walls, one of which is indicated at 15, are provided for enclosing the sides of the feeder.

The primary storage compartment 1 has a bottom which, in the present instance, is substantially W-shaped in cross-section. For this purpose inclined walls 16 and 17 are secured on the upper portions of frame sections 7 and 8 to form a central bottom portion of an inverted V-shape. On each side of the V-shaped central portion there is provided an inclined frame member 18 to which is secured a wall 19 which provides a partition between the storage compartment and the feeding compartment. This partition 19, together with a similar partition at the other side of the feeder, forms the W-shaped bottom for the primary compartment.

The bottom of the feeding compartment is preferably in the form of a trough and comprises a short section 20, which is a continuation of the inclined wall 16; a horizontal section 21, supported on the frame member 9; and an inclined section 22, adjacent the outer wall of the feeding compartment, which prevents the accumulation of grain at the front corner of the compartment where it would be inaccessible to the animal feeding therefrom. The front edge or rim of the feeding compartment 2 is preferably extended outwardly from the upper end of the inclined floor section 22 by means of a short piece of board 23, such as a "two by four", secured in between adjacent uprights of the frame member 5.

Each feeding compartment 2 is preferably equipped with one or more displaceable doors so as to provide for ready access of the animals thereto but which will normally maintain the feeding compartments entirely closed so as to prevent access to the grain of small animals such as birds and rodents. One of the doors for the feeding compartment 2 is indicated at 24 and, in the present instance, is preferably mounted so as to swing about its upper edge. For this purpose there is provided a rod 25 secured in any suitable manner to the frame section 5. The door 24 is pivotally supported on the rod 25 by means of one or more supporting members 26 which, in the present instance, are preferably in the form of U-shaped metal straps passing over the rod 25 and having their ends secured against the sides of the door. The door 24, mounted in this manner, may be swung inwardly by the animal's head to permit the animal to reach the grain in the feeding compartment. When an animal is through feeding and removes its head from the feeding compartment it is apparent that the door 24 will return to its normal vertical position by force of gravity so as to completely close the feeding compartment.

Means are preferably provided for controlling the delivery of feed from the primary compartment 1 to the feeding compartment 2. While this may be done in different ways, in the present instance there is preferably arranged a slidable metal plate 27 arranged in cooperative relation with an opening 28 formed in the partition 19. This metal plate 27 is preferably mounted in guides (not shown) disposed on the partition 19 so that the lower edge of the plate 27 may be moved toward and from the surface of inclined wall 16. In this way the flow of grain from the primary compartment 1 may be adjusted so as to insure the presence of a substantially constant amount of grain in the feeding compartment.

The position of the adjustable plate 27 is preferably controlled from a point outside of the feeder and for this purpose there is provided an angle bracket 29 secured to the outside face of the wall 15 and provided with a bearing opening adapted to receive a rod 30, the lower end of which is threaded into a suitable bracket 31 secured on the plate 27. Endwise movement of the rod 30 is prevented by means of a pair of collars 32 fixedly secured on the rod 30 and contacting the bracket 29 on opposite sides of its bearing opening. The outer free end of rod 30 is suitably formed so as to permit the convenient use of a wrench or crank handle for rotating the rod in one direction or the other to thus raise or lower the plate 27.

An outer trough or receptacle 33 is preferably provided on the opposite side of the wall 15 from the feeding compartment for the purpose of catching and saving any grain which might be carried out of the feeding compartment and not eaten by the animal. For this purpose the horizontal frame members 9 project outwardly some distance beyond the frame section 5 and upon the ends of the frame members 9 is secured a suitable plank 34 covering the ends of the frame members and projecting somewhat thereabove to form an outer rim or side for the trough 33. A suitable floor covering 35 is secured on the frame members 9 between the plank 34 and the outer side wall 15 to form a bottom for the trough 33. The lower end of the outer side wall 15 forms the back of the trough. The ends of the trough 33 are suitably closed by extensions 36 of the end walls 13 and 14.

The grain is delivered to the feeder through a suitable door 37 which closes an opening in one end wall of the feeder. The door 37 may be conveniently mounted for opening and closing movement by means of rollers 38 mounted to travel on a track 39. The door 37 is held closed by a suitable latching means 40.

While a detailed description of but one side of the feeder has been given it will be obvious that the opposite side may be constructed in exactly the same manner so that animals may feed on both sides of the feeder construction. In certain instances, however, it may not be desirable to build a duplicate construction of feeder and, in such case, it is apparent that the present invention has utility when constructed to provide but a single row of feeding compartments.

In the operation and use of the present invention the primary storage compartment is filled with grain through the door 37 and the grain will flow from the primary storage compartment into the feeding compartments 2. If the grain does not flow readily enough through the opening 28, or if it flows out too fast, the opening 28 may be adjusted to the proper size by means of the plate 27 and the rod 30 as previously described. When an animal, such as a mule or horse, desires to obtain feed from the feeding compartment 2 it will displace the door 24 inwardly to approximately the dotted line position by pushing its nose against the door. In this position of the door the animal may obtain the desired amount of feed and, as soon as its head is withdrawn from the feeding compartment, the door 24 swings back to its normally closed position. If the animal drops any of the grain which it removes from the feeding compartment this grain will usually be caught and retained in the trough 33.

It will thus be seen that the present invention provides a feeder construction which is of a strong and durable form, well designed to withstand stresses produced from within by the weight of the grain as well as stresses produced from the outside by high winds. The efficient form of substructure which supports the feeder also cooperates to form a simple and efficient interior construction for the primary storage compartment and the feeding compartment.

If desired, the portion of the side wall 15 below the door 24 may be allowed to project slightly above the piece 23 so as to render it impossible for the door 24 to swing outwardly. Thus the door 24, in closed position, would tend to lean slightly against this projecting edge of the wall 15 rendering it impossible for rats and mice to gain access to the feed in the feeding compartment 2.

The feeder of the present invention has been found, in actual practice, to effect considerable savings in feed as well as operatives' time on plantations located in the southern part of the United States on which large numbers of mules are used to carry on the work. The feed is at all times kept in a clean, sweet condition by reason of the construction in which both rain and dust are kept out of the feeding compartments. The feed is also kept out of the reach of mice, rats and birds.

After the storage compartment is filled with grain and the plate 27 properly adjusted no further care is required until it becomes necessary to again supply more grain to the feeder. Considerable time is thus saved over the old methods of feeding which involve supplying the animals individually with feed. It has been found that when the feed is accessible to the animals as described herein there is less tendency toward overeating and actual savings of several cents per hundred weight of animals per day have been recorded.

While the present description sets forth a preferred embodiment of the invention, numerous changes may be made in the construction without departing from the spirit of the invention, and it is therefore desired that the present embodiment be considered in all respects as illustrative and not restrictive, reference being had to the appended claims rather than to the foregoing description to indicate the scope of the invention.

I claim:

1. An animal feeder comprising in combination a primary storage compartment and a feeding compartment, said primary storage compartment comprising end walls and an outer side wall, a feeding compartment located below said primary compartment and separated therefrom by an inclined partition wall having an opening therein to permit grain to flow from said primary compartment to said feeding compartment, said feeding compartment having an outer wall which forms a continuation of the outer side wall of said primary compartment, an upwardly inclined floor for said primary compartment adapted to direct grain to said opening, a floor section for said feeding compartment extending from said opening to the outer side wall of said feeding compartment, a displaceable door in said feeding compartment adapted to permit access of the head of an animal to said compartment, an upright frame member to which the outer side walls of said primary compartment and said feeding compartment are secured, said upright frame member extending below said feeding compartment a substantial distance to maintain said feeder out of contact with the ground, and an inclined frame member extending upwardly from the lower end of said upright frame member and forming a support for the inclined floor of said primary compartment.

2. An animal feeder, according to claim 1, having a horizontally disposed frame member secured to said upright frame member and to said inclined frame member to form a rigid strut therebetween, said horizontally disposed frame member also serving as a support for the floor of said feeding compartment.

3. An animal feeder, according to claim 1, having a horizontally disposed frame member secured to said upright frame member and to said inclined frame member to form a rigid strut therebetween, said horizontally disposed frame member projecting outwardly and beyond said outer side wall, and a grain catching trough arranged below the edge of said displaceable door and supported on the end of said horizontally disposed frame member.

4. An animal feeder comprising in combination a primary storage compartment and a plurality of feeding compartments, said primary storage compartment comprising a roof, end walls, side walls and a W-shaped bottom portion, said feeding compartments being disposed below said primary compartment and having outer side walls forming continuations of the side walls of said primary compartment, the outer inclined sections of the W-shaped bottom portion forming a partition wall separating said primary compartment from said respective feeding compartments, a floor section for each feeding compartment extending from the lower apexes of the W-shaped bottom portion respectively outward to the outer side walls of said feeding compartments, said partition wall having an opening therein providing for the delivery of grain to said feeding compartment a displaceable door in the outer side wall of each feeding compartment adapted to be displaced by the head of an animal, upright frame members to which the side walls of said primary compartment and said feeding compartments are secured, said frame members extending to a distance below said compartments so as to support said feeder out of contact with the ground, and additional angularly disposed frame members extending respectively from the lower ends of said upright frame members and meeting beneath the upper apex of said W-shaped bottom portion and forming a support for the adjacent wall sections thereof.

5. An animal feeder according to claim 4 having a horizontally disposed frame member secured respectively to said upright and said angularly disposed frame members, said horizontally disposed frame member supporting at least a portion of the floor of said feeding compartment.

6. An animal feeder comprising in combination a plurality of spaced upright frame members, side walls, end walls and a roof supported by said members, frame members respectively extending angularly upward from the lower ends of said spaced upright frame members and meeting along a line located above the lower ends of said side walls, walls supported on said angularly disposed frame members to form a bottom portion of inverted V-shape within said side and end walls, horizontally disposed frame members secured respectively to said upright frame members and said angularly disposed frame members, floor sections supported by said horizontally disposed frame member at each side of said inverted V-shaped bottom portion and extending from said bottom portion outwardly to said side walls, additional angularly disposed frame members extending respectively from said side walls downwardly to a point adjacent the junction of said first mentioned angularly disposed frame members and said horizontally disposed frame members, wall sections formed on said last mentioned angularly disposed frame members, forming, together with said inverted V-shaped bottom portion, a W-shaped bottom for a primary storage compartment, the space between the outer inclined limbs of the W-shaped bottom portion and the respective adjacent side walls and respective adjacent floor sections forming feeding compartments, displaceable doors located in said side walls respectively providing access of an animal's head to said feeding compartments, and an opening between said primary storage compartment and said respective feeding compartments to provide for the delivery of feed thereto.

Signed at St. Louis, Mo., this 12th day of November, 1929.

DUANE HOWARD DOANE.